UNITED STATES PATENT OFFICE.

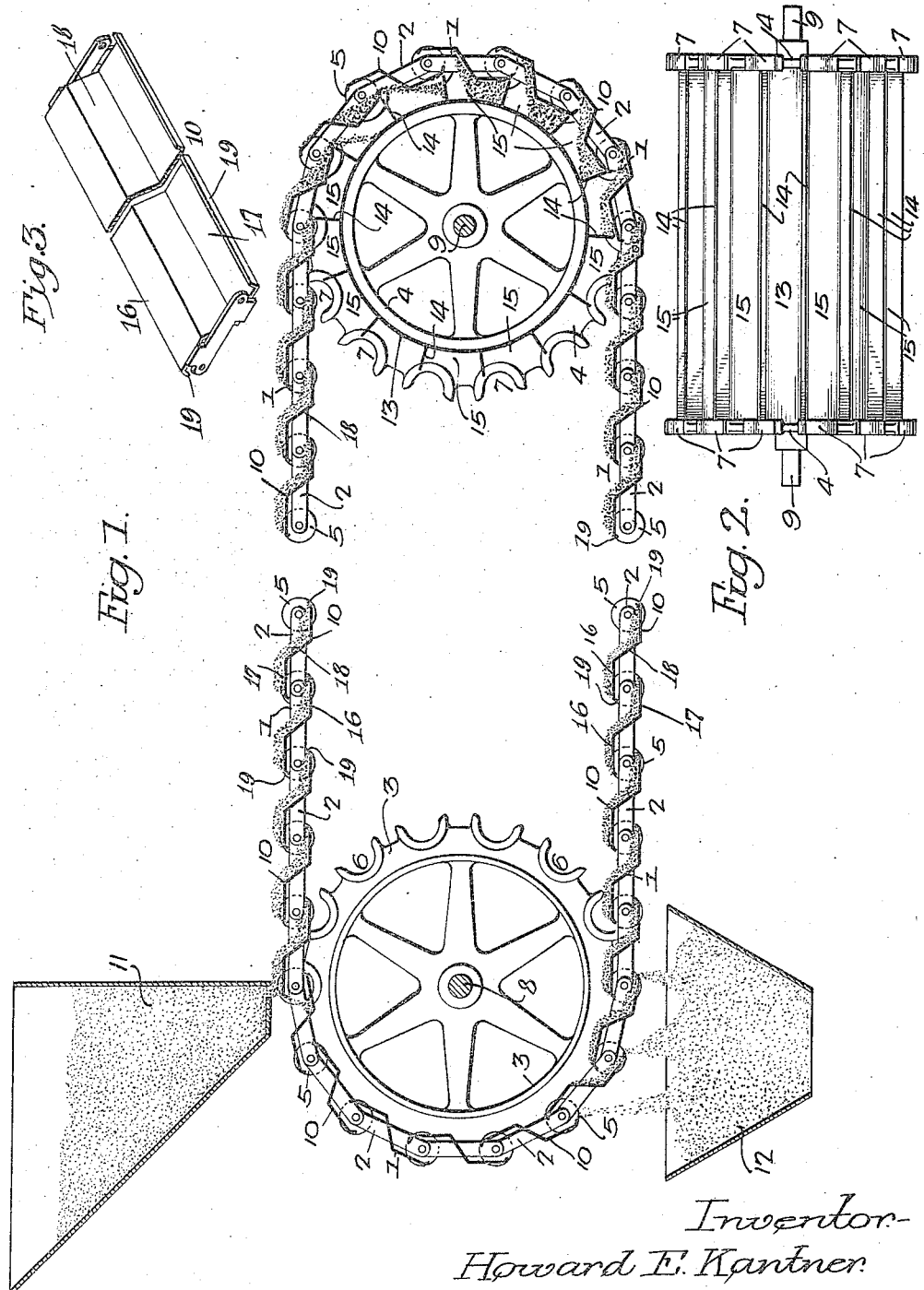

HOWARD E. KANTNER, OF GLENSIDE, PENNSYLVANIA, ASSIGNOR TO PROCTOR & SCHWARTZ, INCORPORATED, OF PHILADELPHIA, PENNSYLVANIA, A CORPORATION OF PENNSYLVANIA.

TRANSFER DRUM FOR CONVEYERS.

1,424,249.    Specification of Letters Patent.    Patented Aug. 1, 1922.

Application filed August 24, 1920. Serial No. 405,593.

*To all whom it may concern:*

Be it known that I, HOWARD E. KANTNER, a citizen of the United States, residing in Glenside, Montgomery County, Pennsylvania, have invented certain Improvements in Transfer Drums for Conveyers, of which the following is a specification.

The object of my invention is to construct a conveyer which will carry material on the upper and lower runs and in which the material will be transferred from one arm to the other by a transfer drum at one end of the apparatus.

In the accompanying drawings:

Fig. 1 is a longitudinal sectional view through a conveyer illustrating my invention;

Fig. 2 is a side view of the transfer drum; and

Fig. 3 is a detached perspective view of one of the pans.

1 is an endless chain conveyer having a chain 2 at each side. These chains pass around sprocket wheels 3 and 4 at each end of the apparatus, in the present instance. Carried by each chain are rollers 5, which seat themselves in the sockets 6 and 7 of the sprocket wheels 3 and 4 respectively, as clearly shown in the drawings. Other types of chains may be used without departing from the essential features of the invention.

The sprocket wheel 3 is mounted on a shaft 8 and the sprocket wheel 4 is mounted on a shaft 9. One of these shafts may be the driving shaft. Extending from side to side of the conveyer are pans 10 made as clearly shown in Fig. 1, so as to carry material on the upper and the lower runs. The construction of the pans is clearly set forth and claimed in a companion application filed by A. O. Hurxthal, August 21, 1920, under Serial No. 405,085.

Each pan 10, in the present instance, consists of two sections 16 and 17, of any suitable form. The sections are connected by an inclined member 18 and the outer edges of the pans are flanged, as shown at 19.

When material is carried by the upper run of the conveyer, it is located in one section, and when material is carried by the lower run, it is located in the other section of each pan.

11 is a feed hopper arranged to feed material to the upper run of the conveyer, as shown in Fig. 1, and 12 is a hopper to receive material as discharged from the lower run of the conveyer. Mounted on the sprocket wheels 4 is the transfer drum 13 having blades 14 extending from side to side of the drum, as clearly shown in Fig. 2, forming pockets 15 to receive material from the upper run of the conveyer. These pockets carry the material to the discharge point, where it is gradually transferred to the lower run of the conveyer, as shown clearly in Fig. 1. By this construction, the material is not only transferred from the upper run to the lower run of the conveyer, but it is also distributed on the lower run in a different position from that in which it was on the upper run.

When the conveyer is located within a drying chamber, the air can circulate freely through all parts of the material being conveyed.

It will be understood that the conveyer can be of any length desired and that two or more conveyers can be placed in such position that material will flow from the lower run of one conveyer to the upper run of another conveyer without departing from the spirit of the invention.

The invention relates particularly to the transfer drum for transferring material from the upper run of a conveyer to the lower run thereof.

The pans of the conveyer may be modified, if desired, but they must be so constructed that as the conveyer begins to turn around the drum, the material will be discharged from one of the pans to one of the pockets 15 of the drum. The material is carried by this pocket until it is discharged onto the opposite side of a pan on the lower run of the conveyer. In the construction shown, the pans act to retain the material in the pockets until it reaches a point near the horizontal run of the conveyer. By this arrangement, the material is transferred with the least amount of disturbance.

I claim:

1. The combination of an endless chain conveyer arranged to carry material on the upper and on the lower run; sprocket wheels around which the conveyer passes; and a transfer drum at the sprocket wheels for receiving the material from the upper run of the conveyer and transferring said material onto the lower run of the conveyer.

2. The combination of an endless conveyer consisting of chains spaced apart and connected by a series of carrying pans, said pans being so arranged as to carry material on the upper and on the lower run of the conveyer; sprocket wheels around which the conveyer passes; and a transfer drum located between the sprocket wheels at one end of the conveyer; said drum having blades spaced apart to form pockets and arranged to receive material from the pans on the upper run and to deliver material to the pans on the lower run of the conveyer.

3. The combination of an endless chain conveyer consisting of two chains connected together by carrying pans shaped so as to carry material on the upper and on the lower run of the conveyer; sprocket wheels around which the conveyer passes; and a transfer drum located between the sprocket wheels at one end of the conveyer and having blades forming pockets, the pans of the conveyer being so formed as to close the pockets during a portion of the time the conveyer is passing around the sprocket wheels so that the material will flow by gravity from the pans at the upper run of the conveyer into the pockets and will be carried by the pockets to a point near the lower run and will be discharged from the pockets into the pans of the lower run.

4. The combination of an endless conveyer having pans arranged to carry material on its upper and lower runs, and a transfer drum around which the conveyer passes, said drum having blades forming pockets, arranged to receive material from the pans of the conveyer at the upper run and to deliver material to the pans at the lower run.

HOWARD E. KANTNER.